Patented Feb. 24, 1948

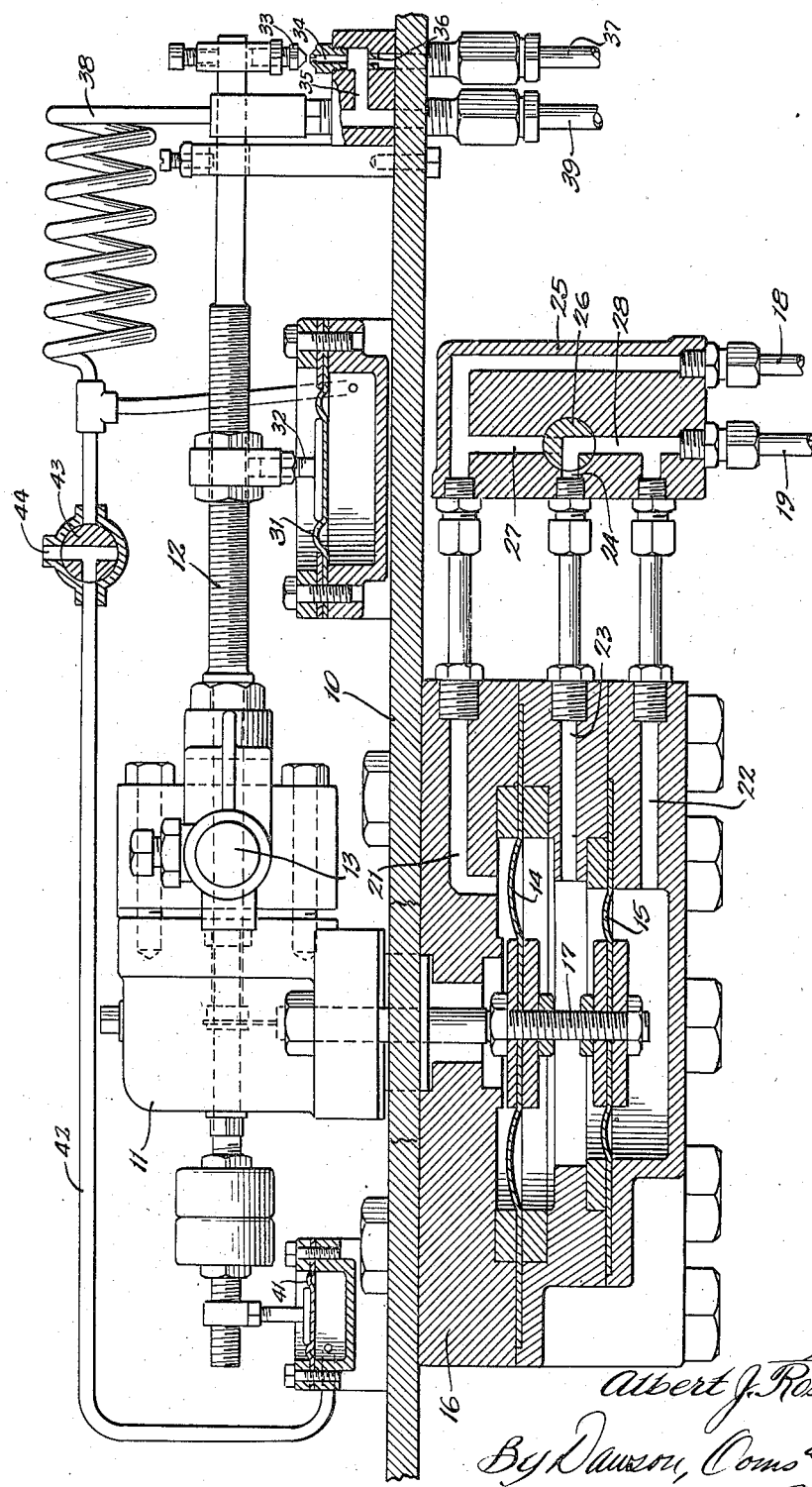

2,436,451

BEST AVAILABLE COPY

UNITED STATES PATENT OFFICE 2,436,451

MEASURING INSTRUMENT

Albert J. Rosenberger, Chicago, Ill., assignor to Republic Flow Meters Company, Chicago, Ill., a corporation of Illinois Application March 22, 1945, Serial No. 584,072

6 Claims. (Cl. 137—153)

This invention relates to measuring instruments and more particularly to instruments of the type which produce a regulated pressure in response to variations in a condition to be measured.

In many instrument applications where instruments are used either to produce an indication or to control a process or the like, it is desirable to be able to change the range of the instrument. For example, measuring instruments which are used to calibrate other instruments or controllers may be called upon to give indications in response to wide variations in conditions to be indicated. Similarly, in the control processes, it is frequently desirable to use the same apparatus for slightly different processes which may require different control ranges.

It is accordingly one of the objects of the present invention to provide a measuring instrument whose range can be adjusted quickly and easily and which provides a high degree of accuracy throughout its full operation.

Another object is to provide a measuring instrument which will produce an output pressure variable throughout different ranges in response to a given range of conditions to be measured.

Still another object is to provide a measuring instrument which is readily adjustable to respond to different ranges of conditions to be measured.

A specific object of the invention is to provide a measuring instrument employing responsive diaphragms or the like in which the effective area of the diaphragms may easily and quickly be changed.

The above and other objects and advantages of the invention will be more readily apparent from the following description when read in connection with the accompanying drawing, in which the single figure is a diagrammatic view of an instrument embodying the invention.

The instrument, as shown, comprises a base or support indicated as a plate 10 upon which the several instrument parts are mounted. Above the base a hollow housing 11 is mounted in which a balance beam 12 is pivoted about an axis 13. The beam 12 may be pivotally mounted in the housing 11 and may be sealed in the housing to prevent escape of fluid therepast in the manner disclosed and claimed in my Patent No. 2,299,179.

The beam is urged in one direction about its pivotal mounting by means responsive to the condition to be measured. As shown, this means comprises a pair of flexible diaphragms 14 and 15, the diaphragm 14 being larger than the diaphragm 15 to provide substantially twice the effective area. The diaphragms are concentrically supported in a housing 16 secured to the plate 10 and are connected to move together by a post 17 which extends through the plate 10 and is connected to the beam 12. In the construction shown, the diaphragms are so arranged that they will exert an upward force on the beam 12 to urge it clockwise about its pivot.

The diaphragms are subjected to different pressures on their outer surfaces through conduits 18 and 19 which are adapted to be connected to different pressure sources. For example, if a flow is to be measured the conduit 18 may be connected to the down stream side and the conduit 19 to the up stream side of a restriction in the flow pipe. In case a pressure is to be measured the conduit 19 may be connected to the source of pressure and the conduit 18 may be vented to atmosphere. As shown the conduit 18 is connected through a passage 21 in the housing 16 to the space above the diaphragm 14 and the conduit 19 is connected through a similar passage 22 to the space below the diaphragm 15.

The space between the diaphragms 14 and 15 communicates through a passage 23 with a valve port 24 formed in a valve housing 25. A rotatable valve plug 26 in the housing can be turned to connect the port 24 selectively to a passage 27 communicating with the conduit 18 or to a passage 28 communicating with the conduit 19. In this way the space between the diaphragms may be selectively connected to either of the pressure sources.

When the valve plug 26 is turned to the position shown, the passage 19 is connected to both sides of the diaphragm 15 so that this diaphragm is ineffective and the force exerted on the beam 12 tending to tilt it clockwise is equal to the area of the diaphragm 14 times the pressure difference between the sources. If the valve plug is turned 90° clockwise both sides of the diaphragm 14 are connected to the conduit 18 so that diaphragm 14 is ineffective and the force exerted on the beam 12 is equal to the area of the diaphragm 15 times the pressure difference between the sources. By properly proportioning the relative areas of the diaphragms 14 and 15, it will be seen that the force exerted on the beam 12 can be changed to any desired extent with the same pressure difference between the sources simply by turning the valve plug 26.

The beam 12 is adapted to be urged in a counterclockwise direction by a flexible diaphragm 31 supported on the plate 10 and connected to the right end of the beam by a post 32. The beam will move through a relatively small range in response to the balance of forces exerted by the diaphragms 14, 15 and 31.

Movement of the beam, as described, is utilized to produce a regulated pressure and for this purpose the beam carries at its outer end a valve member 33 which is moved toward and away from an orifice 34 variably to restrict the orifice. The orifice communicates with a passage 35 which is connected through a restriction 36 to a conduit 37 communicating with a source of fluid such as air under pressure. The passage 35 is connected through tubing 38 to the space below the diaphragm 31 and through a pipe 39 to an indicating or control mechanism of any desired type to indicate the condition or to effect a control operation in response to the condition.

In operation of the instrument as so far described, the differential pressure acting across either of diaphragms 14 or 15 tends to tilt the beam 12 clockwise to restrict the flow of fluid from the orifice 34. This causes an increase of pressure in the passage 35 which acts on the diaphragm 31 so that it tends to tilt the beam 12 counter-clockwise. With this mechanism a pressure will be created in the passage 35 which is proportional to the clockwise tilting force on the beam 12 so that the beam 12 will be balanced. This pressure can be utilized through the conduit 39 either to indicate the condition which causes the pressure differential across diaphragms 14 and 15 or to effect a control operation in response to the condition. It will be seen that the range of pressure produced in the passage 35 will be changed relatively to the range of pressure differentials at the sources according to whether diaphragm 14 or 15 is effective. Therefore, by adjusting the valve 26 to select the desired one of these diaphragms, the range of indication or control produced by the instrument is adjusted.

In addition to the range selection provided by the valve 26 or as a substitute therefor, a second diaphragm 41 may be provided mounted on the base 10 and connected to the left end of the beam 12 to oppose the diaphragm 31. The space below the diaphragm 41 is connected through a pipe 42 and a three-way valve 43 to the pipe 38. The valve 43 may be adjusted to connect the pipe 42 either to pipe 38 or to an atmospheric port 44.

When the valve 43 connects pipes 38 and 42, both diaphragms 31 and 41 are responsive to the pressure in the passage 35. The diaphragm 41 is substantially smaller than the diaphragm 31 and opposes it so that this diaphragm serves to reduce the effective area of the diaphragm 31. Therefore, under these conditions, a greater pressure is required in the passage 35 to produce the same counter-clockwise force on the beam 12 than when the diaphragm 41 is not effective. By turning the valve 43 to vent the space below diaphragm 41 to atmosphere, the effect of this diaphragm is removed and the full area of diaphragm 31 is effective to exert a counterclockwise force on the beam 12. It will be understood that the diaphragm 41 and its control valve 43 may be used in conjunction with the two diaphragms 14 and 15 to provide additional operating ranges for the instrument or that either of the double diaphragm arrangements might be used without the other where only two ranges of operation are desired.

While one embodiment of the invention has been shown and described in detail, it will be understood that this is illustrative only and is not intended as a definition of the scope of the invention, reference being had for this purpose to the appended claims.

What is claimed is:

1. A measuring instrument comprising a pivoted balance beam, diaphragm means responsive to a condition to be measured to urge the beam in one direction, diaphragm means connected to the beam to urge it in the other direction, means responsive to the balance of the forces acting on the beam to produce a regulated fluid pressure, the last named diaphragm means being connected to said means to be responsive to the regulated fluid pressure, one of the diaphragm means including a pair of separate diaphragms, and a valve to equalize the pressure across one of the diaphragms to make it ineffective thereby to change the operating range of the instrument.

2. A measuring instrument comprising a pivoted balance beam, diaphragm means responsive to a condition to be measured to urge the beam in one direction, diaphragm means connected to the beam to urge it in the other direction, means responsive to the balance of the forces acting on the beam to produce a regulated fluid pressure, the last named diaphragm means being connected to said means to be responsive to the regulated fluid pressure, one of the diaphragm means including a pair of separate diaphragms of different sizes, and valve means for selectively making the diaphragms effective thereby to change the operating range of the instrument.

3. A measuring instrument comprising a pivoted balance beam, diaphragm means responsive to a condition to be measured to urge the beam in one direction, diaphragm means connected to the beam to urge it in the other direction, means responsive to the balance of the forces acting on the beam to produce a regulated fluid pressure, the last named diaphragm means being connected to said means to be responsive to the regulated fluid pressure, one of the diaphragm means including a pair of diaphragms of different sizes so connected to the beam as to oppose each other, and valve means to make the smaller of said pair of diaphragms ineffective.

4. A measuring instrument comprising a balance beam, means responsive to a condition to be measured to urge the beam in one direction, a diaphragm connected to the beam to urge it in the other direction, means responsive to the balance of the forces acting on the beam to produce a regulated fluid pressure, the diaphragm being responsive to the regulated fluid pressure, a second diaphragm smaller than the first named diaphragm connected to the beam to urge it in said one direction, and valve means to connect the second diaphragm selectively to the last named means or to atmosphere.

5. A measuring instrument comprising a balance beam, a pair of mechanically interconnected spaced diaphragms of different sizes connected to the beam to urge it in one direction, means to connect the outer faces of the diaphragms to sources of different pressures, valve means to connect the space between the diaphragms selectively to either of the sources, pressure responsive means to urge the beam in the other direction, and means responsive to the balance of forces on the beam to produce a regulated fluid pressure, the pressure responsive means being connected to the last named means to be responsive to the regulated fluid pressure.

6. In a measuring instrument, a pressure responsive unit comprising a pair of spaced concentric diaphragms of different sizes, means mechanically interconnecting the diaphragms to move together, means connecting the outer surfaces of the diaphragms to different sources of pressure, and valve means for selectively connecting the space between the diaphragms to either of said sources.

ALBERT J. ROSENBERGER.

REFERENCES CITED

The following references are of record in the file of this patent:

UNITED STATES PATENTS

| Number | Name | Date |
| --- | --- | --- |
| 2,226,545 | Blasig | Dec. 31, 1940 |
| 2,299,884 | Edwards | Oct. 27, 1942 |
| 2,354,423 | Rosenberger | July 25, 1944 |
| 2,369,463 | Ibbott | Feb. 13, 1945 |